Oct. 6, 1942.    H. W. BOUSMAN    2,298,031
APPARATUS FOR MAKING INSULATION LIFE TESTS
Filed March 29, 1941
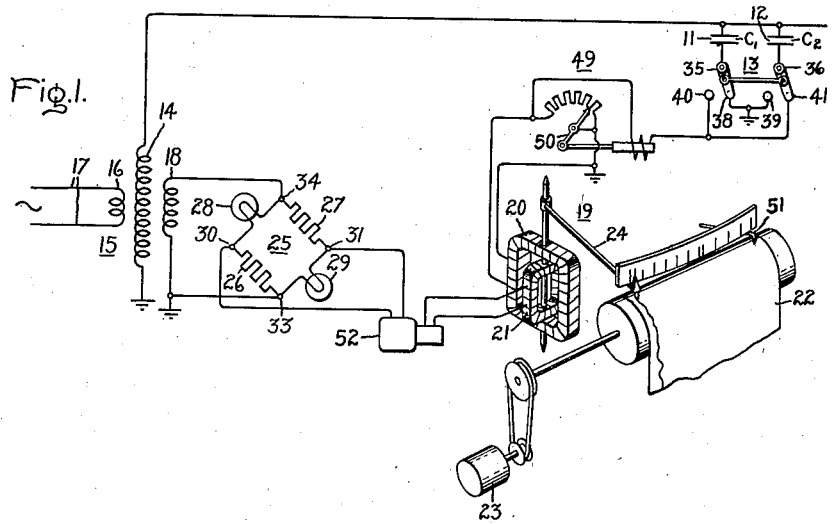
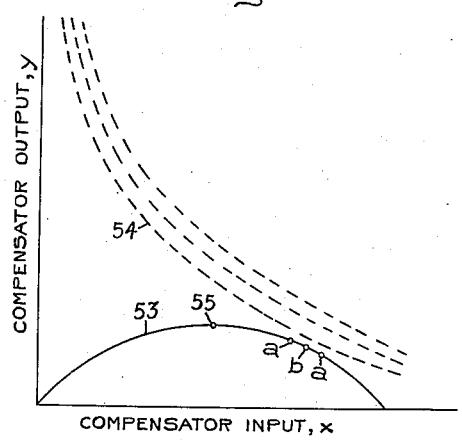
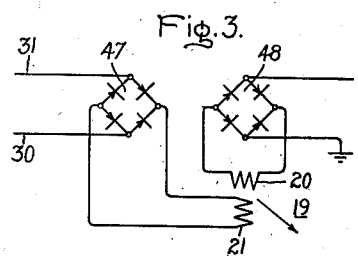
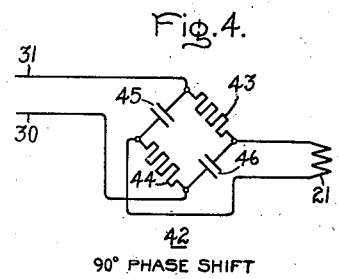
Inventor:
Henry W. Bousman,
by Harry E. Dunham
His Attorney.

Patented Oct. 6, 1942

2,298,031

UNITED STATES PATENT OFFICE 2,298,031

APPARATUS FOR MAKING INSULATION LIFE TESTS

Henry W. Bousman, Scotia, N. Y., assignor to General Electric Company, a corporation of New York Application March 29, 1941, Serial No. 385,963

4 Claims. (Cl. 175—183)

My invention relates to current responsive apparatus and testing circuits and concerns particularly arrangements for monitoring insulation life tests.

It is an object of my invention to provide improved current responsive apparatus such as indicating instruments and recorders which are compensated for variations in input voltage in order that conditions in apparatus being tested may be observed independently of fluctuations in voltage.

Other and further objects and advantages will become apparent as the description proceeds.

A better understanding of the invention will be afforded by the following detailed description considered in connection with the accompanying drawing, and those features which I believe to be novel and patentable will be pointed out in the claims appended hereto.

In the drawing Fig. 1 is an electric circuit diagram of one embodiment of my invention; Fig. 2 is a graph explaining the principle whereby voltage compensation is obtained; Fig. 3 is a fragmentary circuit diagram of a modification in the arrangement of Fig. 1; and Fig. 4 is a corresponding fragmentary circuit diagram of another modification in the arrangement of Fig. 1. Like reference characters are utilized throughout the drawing to designate like parts.

In Fig. 1 I have shown an arrangement for monitoring life tests on insulation samples such as bushings, cable lengths, or capacitors 11 and 12. In order that tests of a sufficient number of specimens may be performed within a given time, a cyclical switch arrangement 13 may be provided for successively connecting a plurality of samples in the circuit and grounding the remaining samples in order to pass the charging current to ground. For performing the test the samples are energized with a relatively high voltage source such as the secondary winding 14 of a transformer 15, having a primary winding 16 connected to an ordinary commercial frequency power source 17.

For voltage measurement an instrument transformer may be connected to the high voltage winding 14, or for simplification, a third winding 18 may be included in the transformer 15. For indicating the quality of the samples 11 and 12, a wattmetric unit 19 is provided. This may, for example, be a dynamometer type of instrument having a current coil 20 and a potential coil 21, one of which is movable with respect to the other. In order that a continuous record of the loss throughout the duration of the life tests may be obtained, the wattmetric unit 19 may be made a part of a recording instrument having a moving chart 22 driven by a motor 23 and cooperating with a deflecting pen 24 carried by the movable element 21 of the wattmetric unit 19.

I have found that the deflection of the wattmetric unit 19 varies in proportion to variations in the square of the voltage if no characteristics of the sample are changed. However, it is very difficult throughout a long life test to maintain the input voltage constant, particularly if for reasons of economy a commercial power source is to be employed. Accordingly, I provide a compensating unit 25 which is interposed between the potential winding 18 of the transformer 15 and the potential coil 21 of the wattmetric unit 19. In this manner I overcome the necessity for providing an accurate voltage regulator which has sufficient current capacity for supplying the testing current to the specimens 11 and 12. The voltage compensating unit 25 may be in the form of what is commonly referred to as a "lamp bridge" having four arms connected in series parallel two of which, 26 and 27, may be ordinary metallic resistors of sufficient current-carrying capacity to vary relatively little in resistance with the slight variations in voltage which are to be expected, and the remaining two of which, 28 and 29, may be incandescent lamps, the filaments of which are composed of tungsten wire and vary considerably in resistance in response to variations in voltage which produces changes in the temperature of the lamp filaments. Such filaments increase in resistance with increase in voltage. My invention does not, however, exclude the use of carbon filaments which decrease in resistance with increase in voltage, and my invention is not limited to the precise arrangement shown for producing an output voltage which varies inversely in response to the input voltage. Two opposite terminals 30 and 31 of the bridge 25 are connected to the instrument coil 21, and the other two terminals 33 and 34 are connected to the winding 18. In utilizing the specific bridge circuit described the electrical dimensions are made such that when the voltages at the windings 14 and 18 are normal the incandescent lamp filaments 28 and 29 have less resistance than the resistors 26 and 27. Accordingly, the bridge is unbalanced and a voltage appears at the output terminals 30 and 31 which are connected to the wattmetric coil winding 21. As the applied voltage rises the bridge approaches balance and the output voltage falls. On the other hand, if the applied voltage drops the bridge unbalance increases and the voltage applied to the winding 21 also increases.

When testing specimens requiring a highly sensitive wattmetric unit, it may be desirable to utilize an amplifying arrangement, or a more sensitive recorder, for example, a photoelectric recorder of the type described in Patent No. 1,897,850, La Pierre. It will be understood that the basic element of the La Pierre photoelectric recorder would be made of the wattmetric type such as the wattmetric unit 19 shown in my drawing.

The cyclical switch 13 may be constructed in any desired manner. For example, it may have a plurality of rotating contacts 35 and 36 driven by a motor (not shown) and connected to the low voltage sides of the samples 11 and 12, respectively, with a set of grounded stationary contacts 38 and 39, and a set of stationary contacts 40 and 41 connected to one side of the instrument current coil 20, the other side of which is grounded. The arrangement is such that the movable contacts 35 and 36 contact successively with the stationary instrument contacts 40 and 41 and cause the specimen or specimens not connected to the instrument to be grounded through the stationary contacts 38 or 39.

The quality of a specimen of insulation may be specified in terms of its loss angle which is 90 degrees minus the angle between the alternating-current vector quantities of applied voltage and current passing through the sample when it is connected to an alternating-current source. This angle may be determined by measuring the power consumed by the specimen connected to an alternating current circuit. The indication of a wattmeter is given by the equation $$P = EI \sin(d+S)$$

where $E$ and $I$ are the effective values of applied voltage and specimen current, $d$ is the dielectric loss angle, and $S$ is the sum of the phase angle errors in the wattmeter and associated circuits. Since $I = \omega CE$ where $\omega = 2\pi$ times the frequency and $C$ = specimen capacitance, the first equation may be reduced to $$P = \omega CE^2 \sin(d+S)$$

From this equation it is seen that if the applied voltage varies the indication will vary as the square of the applied voltage, so that the test would be ineffective for detecting variations in the loss angle $d$ or in the capacitance $C$. However, with the voltage compensation circuit 25 interposed between the potential windings of the transformer and the wattmetric instrument, the deflection of the wattmetric instrument includes a factor which varies inversely to the voltage over a narrow range. Accordingly, the previous equation may be reduced to $$P = AI \sin(d+S)$$
$$= A\omega CE \sin(d+S)$$

where $$A = \frac{E_0^2}{E}$$

which is the characteristic of the bridge 25, and $$I = \omega CE$$

The foregoing equation may be reduced to $$P = \omega CE_0^2 \sin(d+S)$$

where $E_0$ is the nominal voltage at which the test is assumed to have been made. The reading of the wattmetric unit is thus corrected to that which would be obtained with the nominal voltage $E_0$. Any change in reading indicates that a change has taken place either in $C$ or in $d$.

In order to separate changes in $C$ from changes in $d$ a second instrument may be provided having a deflecting or recording unit which is responsive not to true watts but is responsive either to reactive voltamperes or to apparent power. For example, as shown in Fig. 4, a 90-degree phase shifter 42 may be interposed between the output terminals 30 and 31 of the voltage compensating bridge 25 and the voltage winding 21 of the dynamometer unit 10. The precise form of the 90-degree phase shifter 42 does not constitute a part of my invention, but it may take the form, for example, of a pair of resistors 43 and 44 connected in series parallel with a pair of condensers 45 and 46, to form a bridge with input terminals connected across one pair of opposite corners of the bridge and output terminals connected across the other pair of corners of the bridge. It will be understood that if this type of phase shifter is employed a constant frequency power-supply circuit must also be employed.

In order to obtain indications which are proportional to variations in the apparent power of the sample, the circuit of Fig. 1 may be modified by interposing rectifiers 47 and 48 in the connections to the windings 20 and 21 of the wattmetric unit 19. As shown in Fig. 3, the rectifiers 47 and 48 may take the form of full wave copper oxide rectifiers. It will be apparent that in the arrangement modified as shown in Fig. 3, phase shift will have no effect on the deflection of the wattmetric instrument 19. Accordingly, it will be responsive to apparent power.

The manner of separating variations in $C$ and $d$ will be apparent to those skilled in the art from a consideration of the fact that in an instrument modified as shown in Fig. 3 the deflection $P = \omega CE^2$. On the other hand, if the modification represented by Fig. 4 is employed the deflection will be $P = \omega CE_0^2 \cos(d+S)$.

If desired, an automatic scale-shifter and range changing device 49 may be provided for the wattmetric unit which may take the form, for example of a variable-resistance current-shunt connected across the current coil 20 and having a current-responsive ratio-shifting arm 50 actuating also a second pen 51 through linkage (not shown) for recording the scale used. In this manner the initial reading at the beginning of a life test may be kept on the scale while permitting the beginning of deterioration to be detected and allowing the latter stages of deterioration to be shown on a scale of greater range.

If desired, the need for calculating the sum of the phase angle errors $d$ on an electric instrument and the remainder of the circuit may be eliminated by providing an adjustable phase angle shifter 52 in the connections to the potential coil 21 of the wattmetric unit 19. The initial capacitance and phase angle of the specimen would then be measured accurately in a precision bridge and the phase shifter 52 would be adjusted to cause the initial deflection of the wattmetric unit 19 to conform to the power calculated from the properties of the specimen measured on the precision bridge.

It is not necessary that the voltage compensation circuit 25 be effective over a wide range of voltages since relatively small voltage variations are to be expected in modern commercial power sources. From Fig. 2 it will be seen that the voltage output of the compensation circuit 25 is inversely proportional to the voltage input over a small range $aba$. The curve 53 in Fig. 2 represents variations in voltage output between the voltage-compensator terminals 30 and 31 plotted in a vertical direction against voltage input between the terminals 33 and 34 plotted in a horizontal direction. If there were true inverse relationship throughout the entire current and voltage range, the relation between the coordinates of the graph of Fig. 2 would be represented by one of the family of hyperbolic curves 54 representing the equation $KyX=1$. However, it will be seen that within a narrow range one of these curves 54 may be made approximately tangent to the portion $aba$ of the curve 53. The reason for the shape of the curve 53 will be apparent from a consideration of the fact that from zero input voltage the output current and voltage will gradually increase from zero value until the heating of the lamp filaments 28 and 29 becomes sufficient to cause a reduction in voltage between the terminals 30 and 31 sufficient to overcome the increase in voltage applied to the terminals 33 and 34. From this maximum value 55 the curve 53 of Fig. 2 will fall as shown. The compensator 25 is operated in the section $aba$ of the descending portion of the curve 53.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A voltage compensated loss tester comprising voltage source terminals adapted to have a test specimen connected thereto, a wattmetric unit having mutually reacting coils one of which is relatively movable with respect to the other, one of said coils being connected in series with the voltage source and the terminals for the specimen, and a voltage compensating bridge in the form of two incandescent lamps and two resistors connected in series parallel with two diagonally opposite points connected in operative relation to the voltage source and the remaining two diagonally opposite points connected to the remaining coil of the wattmetric unit, the bridge being adjusted to have the lamp resistance less than the resistance of the resistors for a voltage range which includes the normal voltage of the said voltage source.

2. A voltage compensated loss tester for making life tests on insulation specimens which comprises a voltage source, terminals adapted to have a test specimen connected thereto, a dynamometer unit having a pair of mutually reacting windings, one of said windings being connected in series with said voltage source and the terminals for the test specimen, and a non-linear circuit having input terminals connected in responsive relation to the voltage of the voltage source and output terminals, to which the remaining winding of the dynamometer unit is operatively connected, said non-linear circuit having an inverse voltage factor with output voltage decreasing as the input voltage increases.

3. Apparatus such as specified in claim 2 having phase shifting means interposed in the connections to one of the dynamometer windings.

4. A voltage compensated loss tester for making life tests on insulation specimens which comprises a voltage source, terminals adapted to have a test specimen connected thereto, a dynamometer unit having a pair of mutually reacting windings, one of said windings being connected in series with said voltage source and the terminals for the test specimen, a current responsive range changer connected to the dynamometer unit, and a voltage compensation circuit having input terminals connected in responsive relation to the voltage of the voltage source and output terminals to which the remaining winding of the dynamometer unit is operatively connected, said voltage compensation circuit having an inverse voltage factor.

HENRY W. BOUSMAN.